United States Patent [19]
Ward

[11] Patent Number: 6,114,484
[45] Date of Patent: Sep. 5, 2000

[54] POLYMERS FOR CHEMICAL TREATMENT AND PRECIPITATION OF SOLUBLE METAL CYANIDE AND OXOANION COMPOUNDS FROM WASTE WATER

[75] Inventor: William J. Ward, Glen Ellyn, Ill.

[73] Assignee: Nalco Chemical Company, Naperville, Ill.

[21] Appl. No.: 09/192,759

[22] Filed: Nov. 16, 1998

[51] Int. Cl.$^7$ ........................................... C08F 10/00
[52] U.S. Cl. .................... 526/281; 526/280; 526/287; 526/288; 526/291; 526/294; 526/310; 526/312; 526/341
[58] Field of Search ..................... 526/280, 281, 526/287, 288, 291, 294, 310, 312, 341

[56] References Cited

U.S. PATENT DOCUMENTS

| | | |
|---|---|---|
| 2,845,330 | 7/1958 | Zabban . |
| 3,839,215 | 10/1974 | Mulders . |
| 3,874,870 | 4/1975 | Green et al. ................. 71/67 |
| 3,893,916 | 7/1975 | Argabright et al. . |
| 3,932,274 | 1/1976 | Izumi et al. . |
| 4,054,516 | 10/1977 | Izumi et al. . |
| 4,271,053 | 6/1981 | Kelsey et al. ............... 260/29.2 EP |
| 4,399,260 | 8/1983 | Carson . |
| 5,346,627 | 9/1994 | Siefert et al. . |
| 5,510,040 | 4/1996 | Miller et al. . |

FOREIGN PATENT DOCUMENTS

| | | |
|---|---|---|
| 96-11892 | 8/1997 | Japan . |
| 1 546 809 | 5/1979 | United Kingdom . |
| 1572135 | 7/1980 | United Kingdom . |

OTHER PUBLICATIONS

Analytica Chimica Acta, 200, (1987) pp. 181–189, "Investigations of the Extraction of Adenosine Phosphates With N,N'–Dioctadecyl–1,4–Diazabicyclo–[2.2.2] Octane and N,N,N',N'–Tetramethyl–N,N'–Dioctadecyl–Diammonium Alkanes".

Journal of the American Chemical Society, 100:19, (1978), pp. 6287–6288.

Separation Science and Technology, 30(13), (1995), pp. 2779–2782, "A Selective Reagent for the Removal of Chromate, Dichromate, Nitrate, Perchlorate, and Dibasic Phosphate from Methanol Solutions"; A. F. Kopchinski and C. E. Meloan.

Separation Science and Technology, 31(1), (1996), pp. 133–140, "The Synthesis, Characterization, and Testing of a Reagent for the Selective Removal of Dichromate and Perchlorate from Aqueous Solution", A. F. Kopchinski and C. E. Meloan.

*Primary Examiner*—Helen L. Pezzuto
*Attorney, Agent, or Firm*—Michael B. Martin; Thomas M. Breininger

[57] ABSTRACT

A method for the removal of metal cyanides or oxoanions from aqueous streams such as waste water streams with compounds containing 1,4-diazabicyclo[2.2.2]octane. Preferred compounds are polymers formed by free radical polymerization of N-4-vinyl benzyl-N$^1$-1,4-diazabicyclo[2.2.2]octane dichloride (VBBD) such as copolymers poly(VBBD/acrylamide) and poly(VBBD/dimethyl amino ethyl acrylate benzyl chloride quaternary salt. Poly(1,4-dimethylbenzyl-1,4-diazabicyclo[2.2.2]octane dichloride) for the same purposes is also disclosed.

4 Claims, No Drawings

6,114,484

POLYMERS FOR CHEMICAL TREATMENT AND PRECIPITATION OF SOLUBLE METAL CYANIDE AND OXOANION COMPOUNDS FROM WASTE WATER

FIELD OF THE INVENTION

A method for the removal of metal cyanides or oxoanions from aqueous streams such as waste water streams with compounds containing 1,4-diazabicyclo[2.2.2]octane. Preferred compounds are polymers formed by free radical polymerization of N-4-vinyl benzyl-$N^1$-1,4-diazabicyclo[2.2.2]octane dichloride (VBBD) such as copolymers poly(VBBD/acrylamide) and poly (VBBD/dimethyl amino ethyl acrylate benzyl chloride quaternary salt. Poly(1,4-dimethylbenzyl-1,4-diazabicyclo[2.2.2]octane dichloride) for the same purposes is also disclosed.

BACKGROUND OF THE INVENTION

It is known that concentrations of a few parts per million of soluble cyanides such as sodium cyanide are toxic to the microflora and microfauna which comprise the food-chain of higher forms of aquatic life such as fish, waterfoul, and eventually man. For this reason the United States Environmental Protection Agency (E.P.A.) has enacted strict laws to regulate the amount of soluble cyanides which may be discharged from any source into natural waters.

For certain industrial operations, such as the extraction of gold and silver from their ores, soluble cyanide compounds such as sodium cyanide or potassium cyanide are essential reagents used in the extraction process. In earlier years, mining and other industrial companies traditionally discharged their waste waters, containing sometimes as much as 50–100 parts per million (ppm) of soluble cyanide, into streams or rivers. It was assumed that the relatively small concentrations of soluble cyanides in the waste waters would be greatly diluted, dissipated and inactivated by the natural stream of river waters.

Numerous studies by ecologists, limnologists, and environmental scientists have demonstrated that concentrations of free, chemically uncomplexed, cyanide ion ($CN^-$) as low as 1 PPM are toxic to microflora and microfauna comprising the food-chain of fish and other animals.

For operations such as mining, electroplating, and similar industries which produce large volumes of waste waters containing soluble cyanides in concentrations in the range 1–50 ppm or more, the E.P.A. has enacted regulations which prohibit the discharge of waste waters that contain more than 0.02 ppm (1 part in 50 million) to such cyanides.

Compliance with this extremely low concentration of cyanide in industrial waste waters which are discharged to the environment has presented enormous problems to the industries that must meet such standards.

One solution for cyanide removal is aeration. However, aeration of acidified solutions containing free cyanide ion results in only limited removal of cyanide as gaseous hydrogen cyanide. This method is not effective for the removal of complex cyanides with metals such as zinc, nickel, copper, cobalt, and iron among others. In acidified and aerated solutions, these complexes gradually decompose and free cyanide ion increases exponentially.

The use of ferrous sulfate to precipitate soluble cyanide ion as the very insoluble compound, Prussian blue (ferric ferrocyanide) has been known for many years. This process has been shown to be effective in reducing the concentration of free or complexed cyanide ion from relatively high initial concentrations (e.g. 100, 500, 1000 ppm) to very low concentrations of total cyanide in the supernatant solution. Unfortunately, the supernatant solution over the Prussian blue precipitate is found always to contain approximately 0.5–3.0 ppm cyanide ion, depending upon the conditions of treatment of the solution with ferrous ion. This concentration of cyanide is well above that which is allowed by current E.P.A. regulations in waste waters.

Treatment of the solution resulting from Prussian blue precipitation by passage through suitable ion exchange resins has met with only partial or limited success. Although some ion exchange resins can reduce the total cyanide concentration from the initial 0.5–3.0 ppm to less than 0.02 ppm, industrial practice has demonstrated that the efficiency of removal of total cyanide ion rapidly deteriorates as the active adsorption sites on the ion exchange resin become covered. The result is that while some ion exchange resins initially have the ability to reduce the total cyanide concentration in the supernatant solution from Prussian blue precipitation from approximately 0.5–3.0 ppm to less than 0.02 ppm, it is found that the efficiency of these resins falls off rapidly, and the legally permitted upper limit of 0.02 ppm cyanide is soon exceeded.

A further disadvantage of ion exchange resins is their need for regeneration, to desorb the adsorbed complex ions resulting from the treatment of the original solution with ferrous ion. While ferrocyanide and ferricyanide ions can usually be stripped from the resins fairly easily by the passage of suitable concentrated eluting solutions, other complex cyanides (e.g. cuprocyanide, cupricyanide, cobalticyanide) present major problems of removal, requiring extremely long and industrially impractical contact times with the eluting solutions. In many cases it has been found that not all of the adsorbed complex cyanide ions can be removed by eluting solutions. This, of course, progressively reduces the adsorption sites and consequently the efficiency of the regenerated resin.

Another method of cyanide-waste treatment is by alkali-chlorination. In this process, cyanide is first oxidized by chlorine to the cyanate and then is either further oxidized, again using chlorine, to carbon dioxide and nitrogen or the cyanate is hydrolyzed to yield the same products using an acid such as sulfuric acid. This is a relatively costly process and does not directly result in recovery of the metals contained in the waste stream.

Electrolytic oxidation of relatively concentrated cyanide wastes is also possible and is commercially practiced. Electrolytic decomposition processes destroy the cyanide without formation of other toxic compounds and additionally recover much of the metal content as a cathode deposit. This technique, however, is not practical for use in the treatment of dilute solutions such as rinse waters.

In another approach, cyanides contained in waste streams are precipitated to form insoluble metal cyanides. This is illustrated by the Zabban patent, U.S. Pat. No. 2,845,330. Zabban uses a mixture of copper sulfate and sodium sulfite to precipitate insoluble metallic cyanides from waste streams. The principal disadvantage to this method is that it requires special and rather expensive reagents to destroy the cyanides and precipitate the metals.

Yet another method for destruction of the cyanide in waste solutions involves exposing the solution to gamma radiation. The radiation results in rupture of the $C\equiv N$ triple bonds to thereby convert the cyanide ions into non-toxic byproducts, which could be safely discharged into streams or otherwise disposed of. Although such radiation method may give good results in the destruction of cyanide ions, plating and metal finishing shops ordinarily do not have the necessary radiation equipment or apparatus available to practice the method and such equipment can only be obtained by a considerable monetary expenditure.

Furthermore, polymers have been disclosed for the removal of metals from fluid streams. Examples include the use of poly(dithiocarbamates) in U.S. Pat. No. 5,510,040; poly(ethylene dichloride/ammonia) in U.S. Pat. No. 5,346, 627; condensations polymers of higher alkyl halides with polyamines in U.S. Pat. No. 3,932,274; condensation polymers of higher fatty acids with polyamines in U.S. Pat. No. 4,054,516; poly(alpha hydroxyacrylates) in U.S. Pat. No. 3,839,215; poly(isocyanurates) in U.S. Pat. No. 3,893,916.

Moreover, efforts to destroy free cyanide in waste solutions in the past have also involved the addition of $Fe^{+++}$ ions to the solution to form and iron-cyanide complex with the cyanide tightly bound in the complex. However, this method suffers from the cyanide radical still being intact after the completion of the method, and hence significant toxicity still being present in the solution. What is urgently needed, therefore, is a process that will remove free or complex cyanide ions from solution as a stable precipitate and which will leave no detectable soluble cyanide species in solution. Such a process should also be rapid, economically feasible and industrially practicable. The present invention provides a process which attains these criteria.

Among the objects of this invention are: to provide a process by the use of which an aqueous solution containing complexed cyanide ions is treated chemically to reduce the concentration of such ions to analytically undetectable levels; to provide a process by the application of which an aqueous solution containing cyanide ions which are complexed with metal ions as coordination compounds are treated to reduce the concentration of such complexed cyanide ions to analytically undetectable levels in an industrially practicable and economic manner; to provide a process by the use of which complexed cyanide ions are treated to reduce the concentration of such cyanide ions to analytically undetectable levels and to produce a solution which is not toxic to aquatic or terrestrial organisms; to provide a process for removal of undesirable oxoanion contaminants from an aqueous stream, and to provide a process the application of which is environmentally acceptable.

I have discovered a class of compounds which can effectively meet all of the aforementioned objects.

SUMMARY OF THE INVENTION

A method for the removal of metal cyanides or oxoanions from aqueous streams such as waste water streams with compounds containing 1,4-diazabicyclo[2.2.2]octane. Preferred compounds are polymers formed by free radical polymerization of N-4-vinyl benzyl-$N^1$-1,4-diazabicyclo [2.2.2]octane dichloride (VBBD) such as copolymers poly (VBBD/acrylamide) and poly (VBBD/dimethyl amino ethyl acrylate benzyl chloride quaternary salt. Poly(1,4-dimethylbenzyl-1,4-diazabicyclo[2.2.2]octane dichloride) for the same purposes is also disclosed.

DESCRIPTION OF THE INVENTION

The Polymers

Some Dabco-containing non-polymers are known. For example, Dabco-containing vinylic monomer N-4-vinylbenzyl-N'octadecyl-1,4-diazabicyclo[2.2.2]octane diammonium salt for precipitation of anions such as chromate, dichromate, nitrate and perchlorate were described by Kopchinski and Meloan in *Separation Science and Technology*, 30 (13) pp 2779–2782, 1995, and N-4-vinylbenzyl-N'-benzyl-1,4-diazabicyclo[2.2.2]octane dichloride for the same purpose was described by the same authors in *Separation Science and Technology*, 31 (1), pp. 133–140, 1996.

Also, phosphate complexation with non-polymeric Dabco containing compounds has been disclosed in *Analytical Chimica Acta*, 200, (1987) 181–189 and in *J. Am. Chem. Soc.*, 100, (1978) 6287–6288.

Moreover, some Dabco-containing polymeric compounds are known, though they have not been described as useful for oxoanion or metal cyanide removal purposes. For example, a Dabco-containing polymer for use as an antistatic coating containing the structural unit shown below, has been disclosed in JP 96–11892.

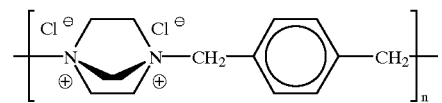

Additionally, ionenes, which are polymers formed from condensation of tertiary amines such as 1,4-diazabicyclo [2.2.2]octane with dihalides, have been described for the synthesis of zeolites in U.K. Patent No. 1,572,135. Furthermore, though DABCO units have been disclosed as components of block copolymers in U.S. Pat. No. 4,399,260, the resultant polymers are not water-soluble. However, the compounds which I have discovered to be useful for metal cyanide and oxoanion removal and now disclose have not been previously determined to be useful for these purposes.

The polymers are water-soluble. The polymers can be solution polymers, dispersion polymers, emulsion polymers, or solid polymers. Molecular weight does not appear to be critical. Preferably the amount of the DABCO-containing vinylic monomer within the DABCO-containing copolymers is from about 10 to about 50 mole percent. In general, the greater the amount of DABCO-containing monomer incorporation, the more effective the copolymer will be at removal of metal contaminants.

The Method

One aspect of the invention is a method for removing contaminants from an aqueous contaminant-containing stream comprising the steps of:
a) treating said aqueous stream with an effective metal contaminant removing amount of a water-soluble 1,4-diazabicyclo[2.2.2]octane containing polymer; said polymer formed from free radical polymerization of monomers, wherein said monomers are selected from the group consisting of:

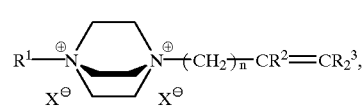

I

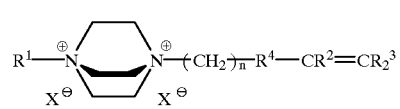

II

-continued

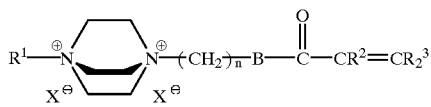

III wherein X⁻ is selected from the group consisting of bromine, chlorine and iodine; n is an integer of from 0 to about 12; B is selected from the group consisting of O and NH; $R^1$, $R^2$ and $R^3$ are selected from the group consisting of: alkyl groups, aryl groups, alkylaryl groups, and arylalkyl groups; and $R^4$ is selected from the group consisting of: alkyl groups, amines, ethers and thioethers;

b) forming water-insoluble metal contaminant-1,4-diazabicyclo[2.2.2]octane containing polymer complexes; and then, c) removing said complexes from said stream to obtain a contaminant free stream.

Another aspect of the invention is a method for removing from an aqueous contaminant-containing stream comprising the steps of:

a) treating said aqueous stream with an effective metal contaminant removing amount of a water-soluble 1,4-diazabicyclo[2.2.2]octane containing polymer; wherein said polymer is formed from free radical polymerization of at least a first monomer and a second monomer, said first monomer is selected from the group consisting of:

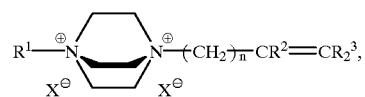

I

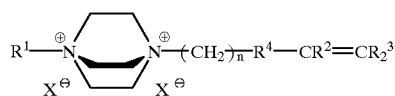

II and

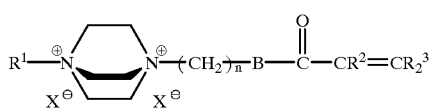

III wherein X⁻ is selected from the group consisting of bromine, chlorine and iodine; n is an integer of from 0 to about 12; B is selected from the group consisting of O and NH; $R^1$, $R^2$ and $R^3$ are selected from the group consisting of: alkyl groups, aryl groups, alkylaryl groups, and arylalkyl groups; and $R^4$ is selected from the group consisting of: alkyl groups, amines, ethers and thioethers; with at least a second monomer selected from the group consisting of: vinyl acetate, diallyldimethyl ammonium chloride, vinyl pyrrolidinone, acrylonitrile, dimethylaminoethyl acrylate methyl chloride quaternary salt, dimethylaminoethyl acrylate benzyl chloride quaternary salt, dimethylaminoethyl acrylate methyl sulfate quaternary salt, dimethylaminoethyl acrylate cetyl chloride quaternary salt, dimethylaminoethyl methacrylate cetyl chloride quaternary salt, dimethylaminoethylmethacrylate methyl chloride quaternary salt, dimethylaminoethylmethacrylate benzyl chloride quaternary salt, dimethylaminoethylmethacrylate methyl sulfate quaternary salt, acrylic acid and salts thereof, methacrylamide and salts thereof, $C_1$–$C_{10}$N-alkyl acrylamide, $C_1$–$C_{10}$N,N-dialkyl acrylamide, $C_1$–$C_{10}$N-alkyl methacrylamide, $C_1$–$C_{10}$N, N-dialkyl methacrylamide, N-aryl acrylamide, N,-N-diaryl acrylamide, N-aryl methacrylamide, N-N-diaryl methacrylamide, N-arylalkyl acrylamide, N,diallylalkyl acrylamide, N-arylalkyl methacrylamide, N,N-diarylalkyl methacrylamide, maleic anhydride, itaconic acid, vinyl sulfonic acid, styrene sulfonic acid, sodium acrylamidomethyl propane sulfonic acid, maleic acid and combinations thereof;

b) forming water-insoluble metal contaminant-1,4-diazabicyclo[2.2.2]octane containing polymer complexes; and then, c) removing said complexes from said stream to obtain a contaminant free stream.

Yet another aspect of the invention is a method for removing contaminants from an aqueous contaminant-containing stream comprising the steps of:

a) treating said aqueous stream with an effective metal contaminant removing amount of a water-soluble 1,4-diazabicyclo[2.2.2]octane containing polymer; wherein said polymer is a condensation polymer formed from condensation of a 1,4-diazabicyclo[2.2.2]octane compound and a dihalide selected from the group consisting of: benzyl dihalides, alkynyl dihalides and cyclohexyl dihalides;

b) forming water-insoluble metal contaminant-1,4-diazabicyclo[2.2.2]octane containing polymer complexes; and then, c) removing said complexes from said stream to obtain a contaminant free stream.

Another aspect of the invention is a polymer composition comprising: a polymer formed by the free radical polymerization of a first monomer selected from the group consisting of:

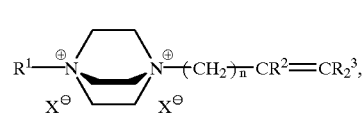

I

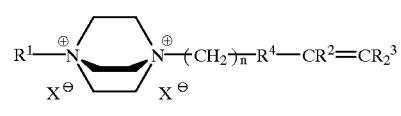

II and

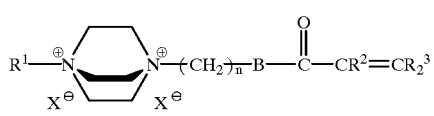

III wherein X is selected from the group consisting of bromine, chlorine and iodine; n is an integer of from 0 to about 12; B is selected from the group consisting of O and NH; $R^1$, $R^2$ and $R^3$ are selected from the group consisting of: alkyl groups, aryl groups, alkylaryl groups, and arylalkyl groups; and $R^4$ is selected from the group consisting of: alkyl groups, amines, aryl groups, alkylaryl groups, arylalkyl groups, ethers and thioethers; with at least a second monomer selected from the group consisting of: vinyl acetate, diallyldimethyl ammonium chloride, vinyl pyrrolidinone, acrylonitrile, dimethylaminoethyl acrylate methyl chloride quaternary salt, dimethylaminoethyl acrylate benzyl chloride quaternary salt, dimethylaminoethyl acrylate methyl sulfate quaternary salt, dimethylaminoethyl acrylate cetyl chloride quaternary salt, dimethylaminoethyl methacrylate cetyl chloride quaternary salt, dimethylaminoethylmethacrylate methyl chloride quaternary salt, dimethylaminoethylmethacrylate benzyl chloride quaternary salt, dimethylaminoethylmethacrylate methyl sulfate quaternary salt, acrylic acid and salts thereof, methacrylamide and salts thereof, $C_1$–$C_{10}$N-alkyl acrylamide, $C_1$–$C_{10}$N,N-dialkyl acrylamide, $C_1$–$C_{10}$N-alkyl methacrylamide, $C_1$–$C_{10}$N, N-dialkyl methacrylamide, N-aryl acrylamide, N,-N-diaryl acrylamide, N-aryl methacrylamide, N-N-diaryl methacrylamide, N-arylalkyl acrylamide, N, diallylalkyl acrylamide, N-arylalkyl methacrylamide, N,N-diarylalkyl methacrylamide, maleic anhydride, itaconic acid, vinyl sulfonic acid, styrene sulfonic acid, sodium acrylamidomethyl propane sulfonic acid, maleic acid and combinations thereof.

The following information applies to any aspect of this invention. Contaminants may be selected from the group consisting of metal cyanides, oxo anions and combinations thereof. The oxo anions may be selected from the group consisting of phosphates, selenates, molybdates, chromates, perchlorates, persulfates, picrates, nitrates and combinations thereof. The metal cyanides may be iron cyanides. The first monomer may be of the formula

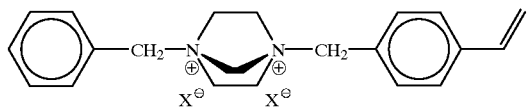

wherein $X^-$ is selected from the group consisting of bromine, chlorine and iodine.

The polymer may be poly(N-4-vinylbenzyl-$N^1$-1,4-diazabicyclo[2.2.2]octane dichloride/acrylamide) or poly (N-4-vinylbenzyl-$N^1$-1,4-diazabicyclo[2.2.2]octane dichloride/dimethylaminoethyl acrylate benzyl chloride quaternary salt).

Metal oxoanions can be removed from systems wherein they are contaminants by forming an electrostatic or geometric complex with the treatment agent. The resulting complex has a much lower solubility in water, causing it to precipitate out. The precipitant can then readily be removed.

After addition of the Dabco-containing polymer to the contaminated aqueous stream, the stream may be filtered to remove complexed materials, which precipitate out of the stream. Filtration can be done in an ultrafiltration unit, or in a clarifier. If the treated stream is fed into a clarifier for removal, settling of the complexed materials can be hastened by the addition to the system of a conventional organic flocculant material. Examples of organic flocculant material conventionally used to treat waste water include high molecular weight polymers and copolymer of acrylamide and acrylic acid.

Occasionally due to the character of the waste water to be treated, it may be preferable to use a high molecular weight cationic polymer as the adjunct flocculant. These materials, examples of which include copolymers of acrylamide with cationic monomers selected from the group consisting of: diallyldimethyl ammonium chloride, dimethylaminoethyl methacrylate methyl chloride, methyl sulfate or benzyl chloride quaternary salts, dimethylaminoethyl acrylate methyl chloride, methyl sulfate or benzyl chloride quaternary salts, and methacrylamidopropyltrimethyl ammonium chloride among others. The correct choice of flocculants for use in the process of the subject invention can be readily determined using conventional jar tests, which will be understood by those skilled in the art.

The dosage of the treatment agent will be influenced by the particular agent selected, as well as the conditions of the stream, though generally from about 1 to about 10,000 ppm of the treatment agent may be added to the stream to be treated. Preferably, from about 10 to about 500 ppm of the treatment agent may be added to the stream.

After the waste water is treated, the treated aqueous liquid may be passed through a filtering device designed to capture the complexes formed. Filtering devices that may be used in the present invention include filters suitable for nanofiltration, ultrafiltration, microfiltration and particle filtration techniques. For example, conventional sand filters, mixed media filters, and membrane filters may all be utilized.

While filtering devices may eliminate the need for solids settling, allowing some degree of settling prior to filtration will further increase the effectiveness of metal cyanide or oxoanion removal.

The method of the present invention may be utilized in a variety of fluid systems, which may fall under the general category of municipal or industrial processing waters. For instance, the present invention may be used to treat waste streams in the lead processing industry, metals from incidental corrosion, in boiler cleaning systems, and also in incinerator scrubber waters. Additionally the present invention may be used to treat flue gas condensate containing metals, and to facilitate manganese and iron removal from process waters. Moreover, the present invention may be used in the plating industry, in waste waters from metal catalyzed processes, in cooling water blowdown, in alloying processes, in refining waste waters, in ground water and in waste water from the semiconductor industry.

The following examples are presented to describe preferred embodiments and utilities of the invention and are not meant to limit the invention unless otherwise stated in the claims appended hereto.

EXAMPLE 1

N-4-vinylbenzyl-N'-benzyl-1,4-diazabicyclo[2.2.2] octane dichloride (VBBD) was prepared in the following manner.

Step one: Diazabicyclo[2.2.2]octane (Dabco), 35.0 g, was dissolved into a reaction flask containing 600 ml of acetone. To this was added, at once, 39.5 g of benzyl chloride with vigorous stirring. After approximately 30 seconds a voluminous white precipitate formed. The reaction mixture was held at room temperature and allowed to stir for 3 additional hours. At the end of this period, the solid was collected by vacuum filtration, washed with acetone, then dried. The yield of white powder was 72.6 g (97.5%).

Step two: The reaction product from the above step, 67.2 g, was dissolved into a reaction flask containing 400 ml of chloroform. A quantity of 4-vinylbenzyl chloride, 43.0 g was added at once to the reaction mixture with stirring. The mixture was then stirred and heated to 58° C. for 20 hours. At the end of this time the reaction mixture was cooled and the solid was removed by filtration and washed with a small amount of cold chloroform, then acetone. The crude solid was recrystallized in n-butanol, collected, and dried under vacuum. A yield of 64 g (58%) of a white powder was obtained.

EXAMPLE 2

N, N'-Dialkyl-1,4-diazabicyclo[2.2.2]octane dibromide compounds such as ditetradecyl, didecyl, dioctyl, or dihexyl Dabco compounds were prepared according to the following procedure.

Into an appropriate reaction flask was placed 4.0 g of 1,4-diazabicyclo[2.2.2]octane (Dabco) and 60 ml of acetonitrile. To this was added 2.1 equivalents of either 1-bromotetradecane, 1-bromodecane, 1-bromo octane, or 1 bromohexane. The reaction mixture was stirred and heated to 65–70° C. for a period of 20 hours. At the end of this time the mixture was cooled in an ice bath, and the white solid removed by vacuum filtration, then washed with a small amount of cold acetonitrile, non-optimized yield ranged from 30–70%.

EXAMPLE 3

Poly-(1,4-dimethylbenzyl-1,4-diazabicyclo[2.2.2]octane dichloride), also referred to as poly(TEDX), was prepared according to the following procedure.

Into a small reaction flask was dissolved 5.90 g of α,α'-dichloroxylene in 20 ml of dimethylformamide (DMF) solvent. A 30 ml DMF solution containing 3.82 g of Dabco was then added to the reaction flask with stirring. A white precipitate formed almost immediately, and stirring became difficult. 20 ml of D.I. water was then added to dissolve the reaction solid, and the mixture was heated to 70° C. The mixture was held at this temperature for 48 hrs. During this time small amounts of water were added as needed in order to dissolve any insoluble product that formed over time. The reaction mixture was mixed with a large volume of acetone, and the precipitated polymer was filtered and dried under vacuum. A near quantitative yield of a water soluble white solid was obtained. Solutions made of this material show little viscosity change, indicating that a low MW material was obtained. The expected structure was confirmed by NMR.

EXAMPLE 4

Copolymers containing acrylamide and N-4-vinylbenzyl-N'-benzyl-1,4-diazabicyclo-[2.2.2]octane dichloride such as poly(AcAm/VBBD) in 85/15 mole ratio were prepared in the following manner.

Into a reaction kettle equipped with a stirring shaft, thermocouple, condenser, and nitrogen inlet, was placed 5.54 g of the VBBD monomer prepared according to the procedure of Example 1. To this was added 11.65 g of a 49% acrylamide solution, 53.67 g of D.I. water, 0.05 g of EDTA, along with 5.0 g of isopropropyl alcohol (chain transfer agent). The reaction mixture was purged with nitrogen and heated to 60° C. with stirring. When the mixture reached the desired temperature, 0.0896 g of azobis-isobutyronitrile initiator (V-50) (dissolved in a minimum amount of D.I. water) was added to the reactor. After 5 minutes the mixture began to thicken, and the temperature increased to 70° C. and held at this temperature. After 20 minutes of reaction, an additional 37 g of water was added to the reaction. The mixture was held at 70° C. and stirred for 2 additional hours, then cooled and the product collected. The resulting product was a thick slightly turbid solution containing a theoretical polymer content of 10%.

EXAMPLE 5

Copolymers containing N,N-dimethyl-N-benzyl-2-aminoethylacrylate chloride (DMAEA.BCQ) and N-4vinylbenzyl-N'-benzyl-1,4-diazabicyclo[2.2.2]octane dichloride, such as poly (DMAEA.BCQ/VBBD) in an 85/15 mole ratio were prepared in the following manner.

Into a reaction kettle equipped with a stirring shaft, thermocouple, condenser, and nitrogen inlet, was placed 2.3 g of the VBBD monomer prepared according to the procedure of Example 1. To this was added 12.8 g of a 70% DMAEA.BCQ solution, and 59.9 g of D.I. water. The reaction mixture was adjusted to a pH of 5.0 with a few drops of a 25% NaOH solution, then purged with nitrogen and heated to 60° C. with stirring. When the mixture reached the desired temperature, 0.0206 g of V-50 initiator (dissolved in a minimum amount of D.I. water) was added to the reactor. The reaction was held at 60° C. for one half hour. The temperature was then raised to 77° C., and held an additional 2 hr. The mixture was then cooled and the product collected. The resulting solution was viscous (113 cps) and clear, containing a theoretical polymer content of 15%. Table 1 illustrates the copolymers of various mole ratios which were synthesized according to the procedures of Examples 4 and 5.

TABLE 1

| COPOLYMERS SYNTHESIZED | | | |
|---|---|---|---|
| Polymer | Mole % AcAm[1] | Mole % DMAEA.BCQ[2] | Mole % VBBD[3] |
| A | 0 | 0 | 100 |
| B | 0 | 0 | 100 |
| C | 0 | 0 | 100 |
| D | 100 | 0 | 0 |
| E | 100 | 0 | 0 |
| F | 100 | 0 | 0 |
| G | 100 | 0 | 0 |
| H | 90 | 0 | 10 |
| I | 90 | 0 | 10 |
| J | 90 | 0 | 10 |
| K | 90 | 0 | 10 |
| L | 95 | 0 | 5 |
| M | 85 | 0 | 15 |
| N | 50 | 0 | 50 |
| O | 0 | 100 | 0 |
| P | 0 | 100 | 0 |
| Q | 0 | 90 | 10 |
| R | 0 | 85 | 15 |
| S | 0 | 85 | 15 |
| T | 0 | 50 | 50 |

1 = acrylamide
2 = dimethyl aminoethyl acrylate benzyl chloride quaternary salt
3 = N-4-vinylbenzyl-N'-benzyl-1,4,-diazabicycol[2.2.2]octane dichloride.

EXAMPLE 6

To determine the efficiency of the poly(TEDX) synthesized according to the procedure of Example 3, the following test was utilized. Synthetic wastewater was prepared by dissolving enough purified potassium ferricyanide ($K_3Fe(CN)_6$) into a quantity of D.I. water, such that the amount of total cyanide was calculated to be 100 ppm, as free cyanide ion. Jar testing with this waste was performed in the following manner: 100 ml of the test solution was placed into a 150 ml glass beaker. The beakers were placed on a Phipps and Bird gang stirring apparatus fitted with flat paddles. The test solution was stirred at high speed (150 rpm). A 10% actives solution of the test compound was made up, then dosed at the appropriate level, and stirred at this speed for 10 minutes. The speed was then slowed to 35 rpm and stirred an additional 10 minutes. At the end of this time stirring was stopped, and the jars were allowed to settle for 10 minutes. Approximately 50 ml of the supernatant was then filtered through a 0.45μ filter. The sample was then checked for color absorption using the Hach DR-2000 instrument, or a for total cyanide analysis was performed. Table 2 shows that at a dosage of 300 ppm, cyanide was almost completely removed.

TABLE 2

Activity of poly (TEDX)

| Dose (ppm) | waste water pH | Total Cyanide Level (ppm) |
|---|---|---|
| 0 | 7.7 | 105 |
| 100 | 7.7 | 57.5 |
| 200 | 7.7 | 32.7 |
| 300 | 7.7 | 0.258 |
| 400 | 7.7 | 2.69 |
| 500 | 7.7 | 29.4 |
| 200 | 10 | 30.4 |
| 300 | 10 | 2.14 |
| 400 | 10 | 3.44 |

The same procedure was utilized to obtain the results of Table 3 below. The results indicate that poly(VBBD/AcAm) as represented by entries L, M and N synthesized according to the procedure described in Example 4 and poly(VBBD/DMAEA.BCQ) polymers as represented by entries Q and R synthesized according to the procedure described in Example 5 are effective cyanide removal agents, and work better than conventional treatment 0, poly (DMAEA.BCQ). The VBBD monomer works, yet is less advantageous then the compounds disclosed herein because the resulting precipitate is a very fine colloid which requires additional solid/liquid separation techniques, such as extensive filtration or additional chemical treatment to remove the complex from solution. By contrast, the compounds L, M, N, Q and R are self-flocculating and therefore easier to remove from solution.

TABLE 3

| Treatment | Polymer Dosage[4] | Pt-Co Units | Total CN⁻ Analysis ppm |
|---|---|---|---|
| None | — | 370 | 94.1 |
|  | — | 376 |  |
|  | — | 386 | 100 |
| poly(TEDX) | 100 | 282 |  |
|  | 200 | 176 | 44.8 |
|  | 300 | 74 | 17.9 |
|  | 400 | 3 | 1.16 |
|  | 500 | 31 | 4.93 |
|  | 600 | 258 |  |
| VBBD Monomer | 200 | 302 | 75.2 |
|  | 300 | 203 |  |
|  | 400 | 113 | 26.7 |
|  | 500 | 62 | 14.7 |
|  | 600 | 38 | 7.90 |
|  | 1000 | 18 | 2.81 |
|  | 1500 | 6 |  |
|  | 2000 | 5 | 1.89 |
|  | 2500 | 8 | 1.98 |
| L | 100 | 355 |  |
|  | 200 | 342 |  |
|  | 300 | 336 |  |
|  | 400 | 335 |  |
|  | 500 | 322 |  |
| N | 300 | 131 |  |
|  | 400 | 52 | 14.0 |
|  | 500 | 1 | 0.18 |
|  | 600 | 10 | 1.14 |
|  | 700 | 18 | 2.69 |
| M | 100 | 318 |  |
|  | 200 | 271 |  |
|  | 300 | 227 |  |
|  | 400 | 180 |  |
|  | 500 | 133 | 32.6 |
|  | 600 | 86 | 20.8 |
|  | 700 | 55 | 12.8 |
|  | 800 | 7 | 0.40 |
|  | 900 | 8 | 0.48 |
| O | 100 | 288 |  |
|  | 150 | 213 |  |
|  | 200 | 139 |  |
|  | 300 | 63 | 34.5 |
|  | 400 | 37 | 14.6 |
|  | 500 | 250 | 1.31 |
| Q | 100 | 284 |  |
|  | 200 | 208 | 53.0 |
|  | 300 | 123 | 29.9 |
|  | 400 | 38 | 7.96 |
|  | 500 | 80 | 0.73 |
| R | 100 | 301 |  |
|  | 200 | 211 | 54.3 |
|  | 300 | 128 | 32.8 |
|  | 400 | 44 | 11.3 |
|  | 450 | 2 | 0.33 |
|  | 500 | 5 | 0.62 |

4 = ppm polymer actives

Changes can be made in the composition, operation and arrangement of the method of the present invention described herein without departing from the concept and scope of the invention as defined in the following claims:

What is claimed is:

1. A polymer composition comprising: a polymer formed by the free radical polymerization of a first monomer selected from the group consisting of:

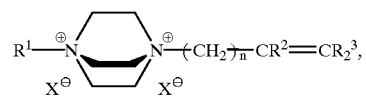

I

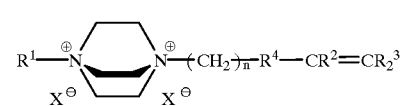

II and

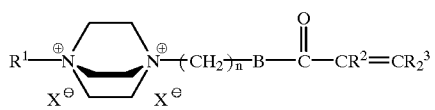

III wherein $X^-$ is selected from the group consisting of bromine, chlorine and iodine; n is an integer of from 0 to about 12; B is selected from the group consisting of O and NH; $R^1$, $R^2$ and $R^3$ are selected from the group consisting of: alkyl groups, aryl groups, alkylaryl groups, and arylalkyl groups; and $R^4$ is selected from the group consisting of: alkyl groups, amines, aryl groups, alkylaryl groups, arylalkyl groups, ethers and thioethers; with at least a second monomer selected from the group consisting of: vinyl acetate, diallyldimethyl ammonium chloride, vinyl pyrrolidinone, acrylonitrile, dimethylaminoethyl acrylate methyl chloride quaternary salt, dimethylaminoethyl acrylate benzyl chloride quaternary salt, dimethylaminoethyl acrylate methyl sulfate quaternary salt, dimethylaminoethyl acrylate cetyl chloride quaternary salt, dimethylaminoethyl methacrylate cetyl chloride quaternary salt, dimethylaminoethylmethacrylate methyl chloride quaternary salt, dimethylaminoethylmethacrylate benzyl chloride quaternary salt, dimethylaminoethylmethacrylate methyl sulfate quaternary salt, acrylic acid and salts thereof, methacrylamide and salts thereof, $C_1$–$C_{10}$ N-alkyl acrylamide, $C_1$–$C_{10}$ N,N-dialkyl acrylamide, $C_1$–$C_{10}$ N-alkyl methacrylamide, $C_1$–$C_{10}$ N,N-dialkyl methacrylamide, N-aryl acrylamide, N,-N-diaryl acrylamide, N-aryl methacrylamide, N-N-diaryl methacrylamide, N-arylalkyl acrylamide, N, diallylalkyl acrylamide, N-arylalkyl methacrylamide, N,N-diarylalkyl methacrylamide, maleic anhydride, itaconic acid, vinyl sulfonic acid, styrene sulfonic acid, sodium acrylamidomethyl propane sulfonic acid, maleic acid and combinations thereof.

2. The polymer composition of claim 1 wherein said first monomer is of the formula

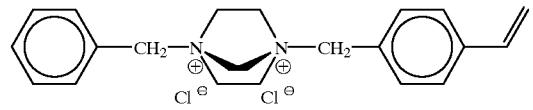

3. Poly(N-4-vinylbenzyl-N'-benzyl-1,4-diazabicyclo[2.2.2]octane dichloride/acrylamide).

4. Poly(N-4-vinylbenzyl-N'-benzyl-1,4-diazabicyclo[2.2.2]octane dichloride/dimethyl aminoethyl acrylate benzyl chloride quaternary salt).

* * * * *